(12) United States Patent
Sakai

(10) Patent No.: US 12,459,251 B2
(45) Date of Patent: Nov. 4, 2025

(54) PRINTING APPARATUS, DATA TRANSMITTING METHOD AND MEDIUM

(71) Applicant: BROTHER KOGYO KABUSHIKI KAISHA, Nagoya (JP)

(72) Inventor: Katsunori Sakai, Toyokawa (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 146 days.

(21) Appl. No.: 18/396,346

(22) Filed: Dec. 26, 2023

(65) Prior Publication Data

US 2024/0262100 A1    Aug. 8, 2024

(30) Foreign Application Priority Data

Feb. 2, 2023   (JP) ................................. 2023-014789

(51) Int. Cl.
| | |
|---|---|
| *B41J 2/045* | (2006.01) |
| *B41J 2/155* | (2006.01) |
| *B41J 11/00* | (2006.01) |
| *G06K 15/02* | (2006.01) |
| *G06K 15/10* | (2006.01) |

(52) U.S. Cl.
CPC ....... *B41J 2/04541* (2013.01); *B41J 2/04586* (2013.01); *B41J 2/155* (2013.01); *B41J 11/007* (2013.01); *G06K 15/102* (2013.01); *G06K 15/181* (2013.01)

(58) Field of Classification Search
CPC .... B41J 2/04541; B41J 2/04586; B41J 2/155; B41J 11/007; G06K 15/102; G06K 15/181
See application file for complete search history.

(56) References Cited

U.S. PATENT DOCUMENTS

2022/0097361 A1*   3/2022   Yoshida ................. B41J 2/0452

FOREIGN PATENT DOCUMENTS

| JP | 2005-231267 A | 9/2005 |
|---|---|---|
| JP | 2010-146253 A | 7/2010 |
| JP | 2019-209600 A | 12/2019 |
| JP | 2022-055076 A | 4/2022 |
| JP | 2023-011386 A | 1/2023 |

OTHER PUBLICATIONS

Notice of Reasons for Rejection for corresponding Japanese Patent Application No. 2023-014789 (Nov. 28, 2023).

* cited by examiner

*Primary Examiner* — Bradley W Thies
(74) *Attorney, Agent, or Firm* — Kenealy Vaidya LLP

(57) ABSTRACT

There is provided a printing apparatus including: a main control circuit; a sub-control circuit group connected to the main control circuit in series, the sub-control circuit group being configured to transfer image data from the main control circuit downstream; and a head group configured to be driven by the sub-control circuit group. The sub-control circuit group has at least two sub-control circuits including a second sub-control circuit and a first sub-control circuit connected to the second sub-control circuit at an upstream of the second sub-control circuit. The image data includes second image data and first image data. The main control circuit is configured to: transmit the second image data to the second sub-control circuit; and transmit the first image data to the first sub-control circuit after the transmitting of the second image data.

14 Claims, 11 Drawing Sheets

PRINTING APPARATUS, DATA TRANSMITTING METHOD AND MEDIUM

REFERENCE TO RELATED APPLICATIONS

This application claims priority from Japanese Patent Application No. 2023-014789 filed on Feb. 2, 2023. The entire content of the priority application is incorporated herein by reference.

BACKGROUND ART

Image forming system provided with a PC configured to generate image data and a plurality of distribution boards which is connected in series to the PC is proposed. A plurality of head controllers is connected to the plurality of distribution boards, respectively. Each of the plurality of head controllers controls the driving of a head.

SUMMARY

From the PC, the image data is transmitted to the upstream-most distribution board, of the plurality of distribution boards, and the image data is transferred one by one down to the downstream-most distribution board of the plurality of distribution boards.

The present disclosure has been made in view of the above-described situation; an object of the present disclosure is to provide a printing apparatus, a data transmitting method and a medium each of which is capable of improving the efficiency of data transferring.

A printing apparatus according to an aspect of the present disclosure is a printing apparatus including: a main control circuit; a sub-control circuit group connected to the main control circuit in series, the sub-control circuit group being configured to transfer image data from the main control circuit downstream; and a head group configured to be driven by the sub-control circuit group. The sub-control circuit group has at least two sub-control circuits including a second sub-control circuit and a first sub-control circuit connected to the second sub-control circuit at an upstream of the second sub-control circuit. The image data includes second image data and first image data. The main control circuit is configured to: transmit the second image data to the second sub-control circuit; and transmit the first image data to the first sub-control circuit after the transmitting of the second image data.

A data transmitting method according to an aspect of the present disclosure is a data transmitting method executed by a printing apparatus, the printing apparatus including: a main control circuit; a sub-control circuit group connected to the main control circuit in series, the sub-control circuit group being configured to transfer image data from the main control circuit downstream; and a head group configured to be driven by the sub-control circuit group. The sub-control circuit group has at least two sub-control circuits including a second sub-control circuit and a first sub-control circuit connected to the second sub-control circuit at an upstream of the second sub-control circuit. The image data includes second image data and first image data. The method including: transmitting the second image data to the second sub-control circuit by the main control circuit; and transmitting the first image data to the first sub-control circuit by the main control circuit, after the transmitting of the second image data.

A medium according to an aspect of the present disclosure is a non-transitory computer-readable medium storing a program that is executable by a printing apparatus, the printing apparatus including: a main control circuit; a sub-control circuit group connected to the main control circuit in series, the sub-control circuit group being configured to transfer image data from the main control circuit downstream; and a head group configured to be driven by the sub-control circuit group. The sub-control circuit group has at least two sub-control circuits including a second sub-control circuit and a first sub-control circuit connected to the second sub-control circuit at an upstream of the second sub-control circuit. The image data includes second image data and first image data. The program is configured to cause the main control circuit to execute a process of: transmitting the second image data to the second sub-control circuit; and transmitting the first image data to the first sub-control circuit after the transmitting of the second image data.

In the printing apparatus, the data transmitting method and the medium each according to an aspect of the present disclosure, the image data is transmitted to the sub-control circuit on the upstream, after the transmitting of the image data to the sub-control circuit on the downstream. Accordingly, it is possible to transmit the image data to the sub-control circuit on the upstream before the sub-control circuit on the downstream receives the image data, and to thereby improve the efficiency of the data transmitting.

DESCRIPTION

Figure 1:
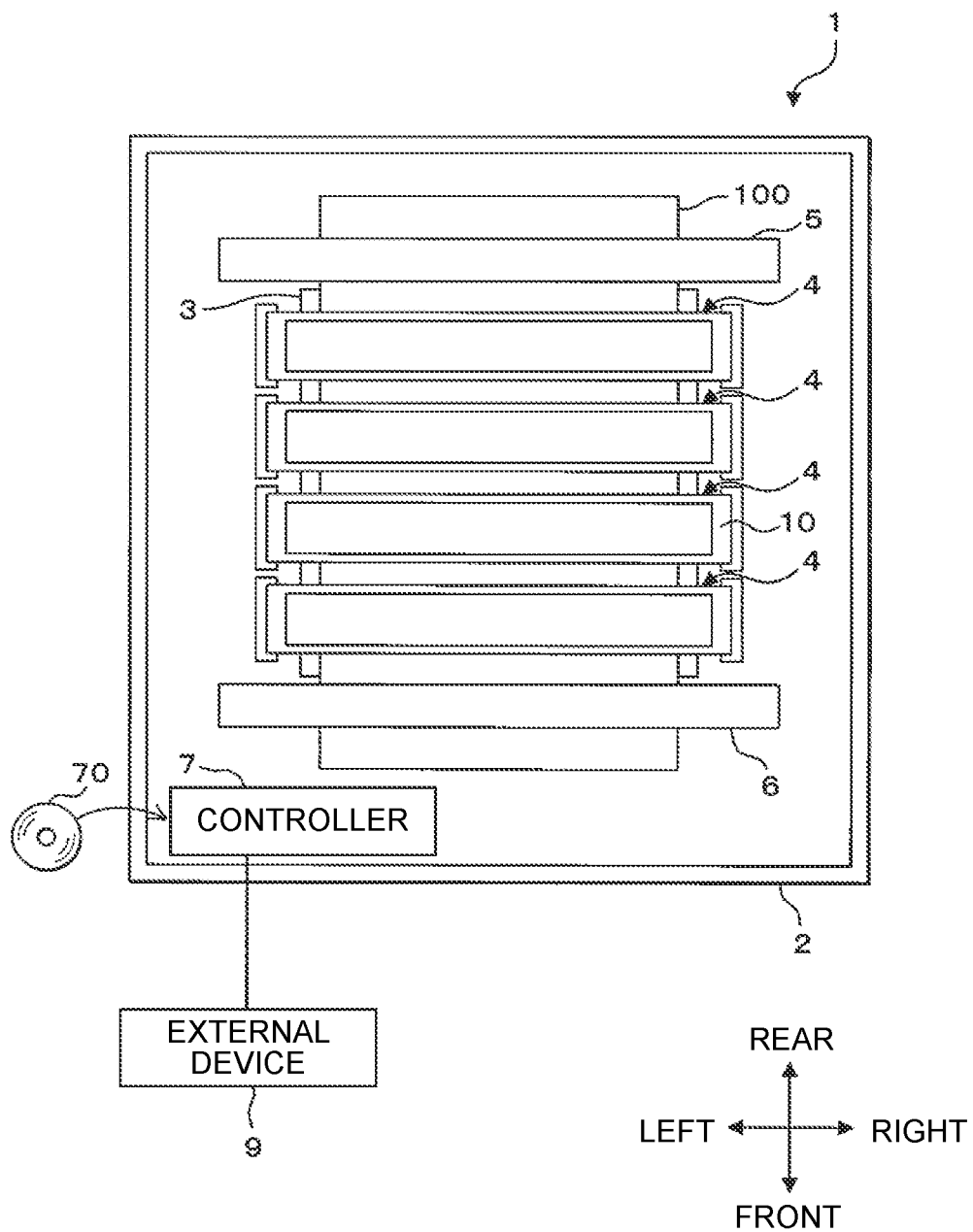
FIG. 1 is a schematic plan view of a printing apparatus.

In the following, the present disclosure will be explained based on the drawings depicting a printing apparatus according to a first embodiment. FIG. 1 is a schematic plan view of a printing apparatus 1. In FIG. 1, a conveying direction of a recording paper 100 corresponds to a front-rear direction of the printing apparatus 1. Further, a width direction of the recording paper 100 corresponds to a left-right direction of the printing apparatus 1. The recording paper 100 corresponds to a recording medium. Furthermore, a direction orthogonal to the front-rear direction and the left-right direction, namely, a direction perpendicular to the sheet surface of FIG. 1 corresponds to an up-down direction of the printing apparatus 1.

As depicted in FIG. 1, the printing apparatus 1 is provided with a case 2, and a platen 3, four ink-jet heads 4, two conveying rollers 5 and 6, and a controller 7, etc., which are accommodated in the inside of the case 2. The recording paper 100 passes on the upper surface of the platen 3. The four ink-jet heads 4 are arranged side by side in the conveying direction, at a location above the platen 3. Each of the four ink-jet heads 4 is a head of a so-called line type. An ink from an ink tank (not depicted in the drawings) is supplied to each of the four ink-jet heads 4. Inks of mutually different colors are supplied to the four ink-jet heads 4.

As depicted in FIG. 1, the two conveying rollers 5 and 6 are arranged, respectively, on the rear side and the front side with respect to the platen 3. Each of the two conveying rollers 5 and 6 is driven by a non-illustrated motor, and conveys the recording paper 100 on the platen 3 frontward. The two conveying rollers 5 and 6 correspond to a conveying part. The controller 7 controls the printing apparatus 1 based on a control program. The controller 7 is connected to an external device 9, such as a PC, etc., so that data is transmittable between the controller 7 and the external device 9, and is configured to drive the respective parts of the printing apparatus 1 based on printing data transmitted from the external device 9, thereby executing printing.

Figure 2:
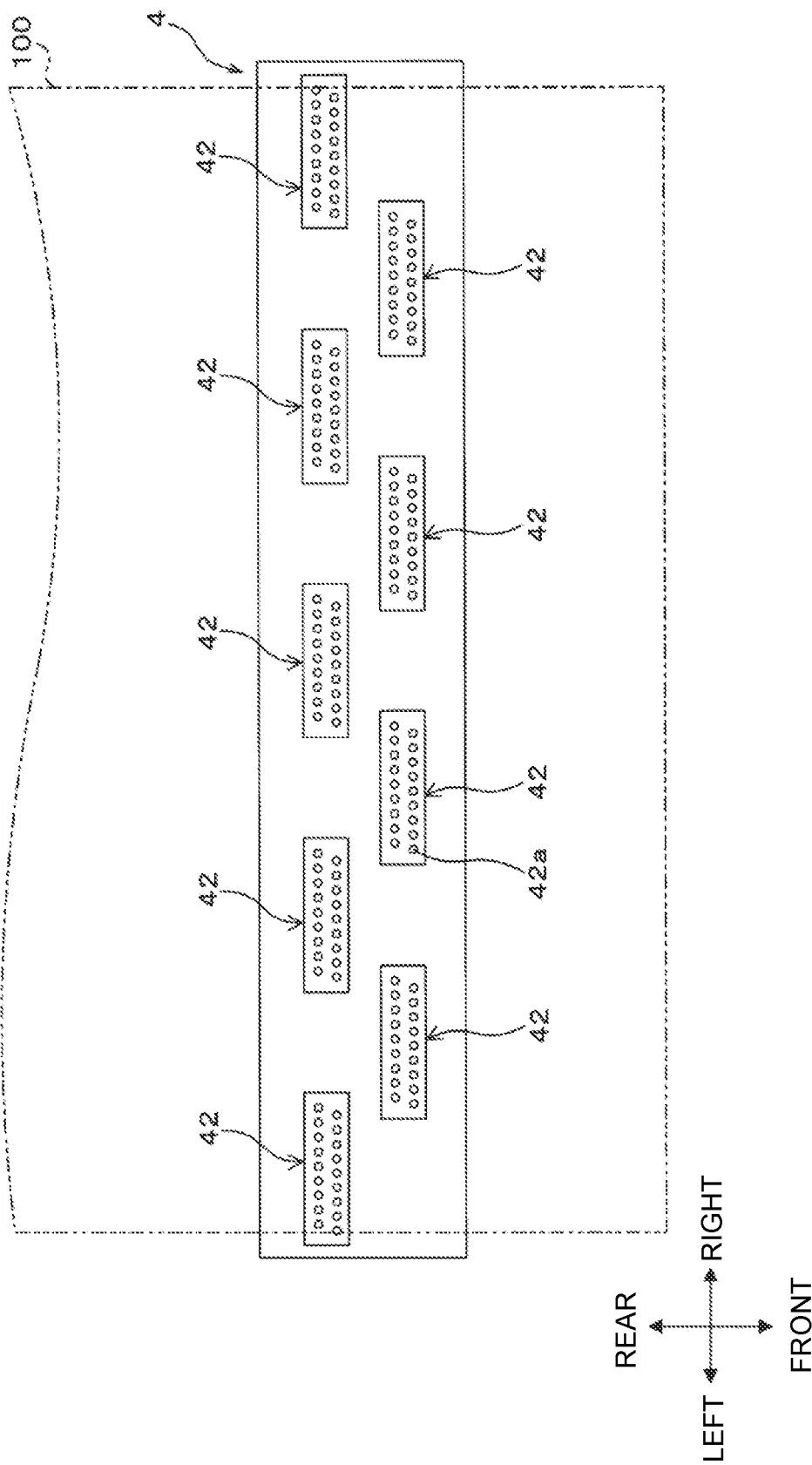
FIG. 2 is a plan perspective view of an ink-jet head.

FIG. 2 is a plan perspective view of the ink-jet head 4. The ink-jet head 4 is provided with a plurality of heads 42. Each of the plurality of heads 42 corresponds to a head unit. The plurality of head units 42 are arranged in two rows in the front-rear direction. In a row on the front side, four heads 42 are arranged along the left-right direction; in a row on the rear side, five heads 42 are arranged along the left-right direction. A plurality of nozzles 42a is provided on a lower surface of the head 42. Note that the number of the head 42 and the number of the row of the heads 42 are not limited, and can be changed.

Figure 3:
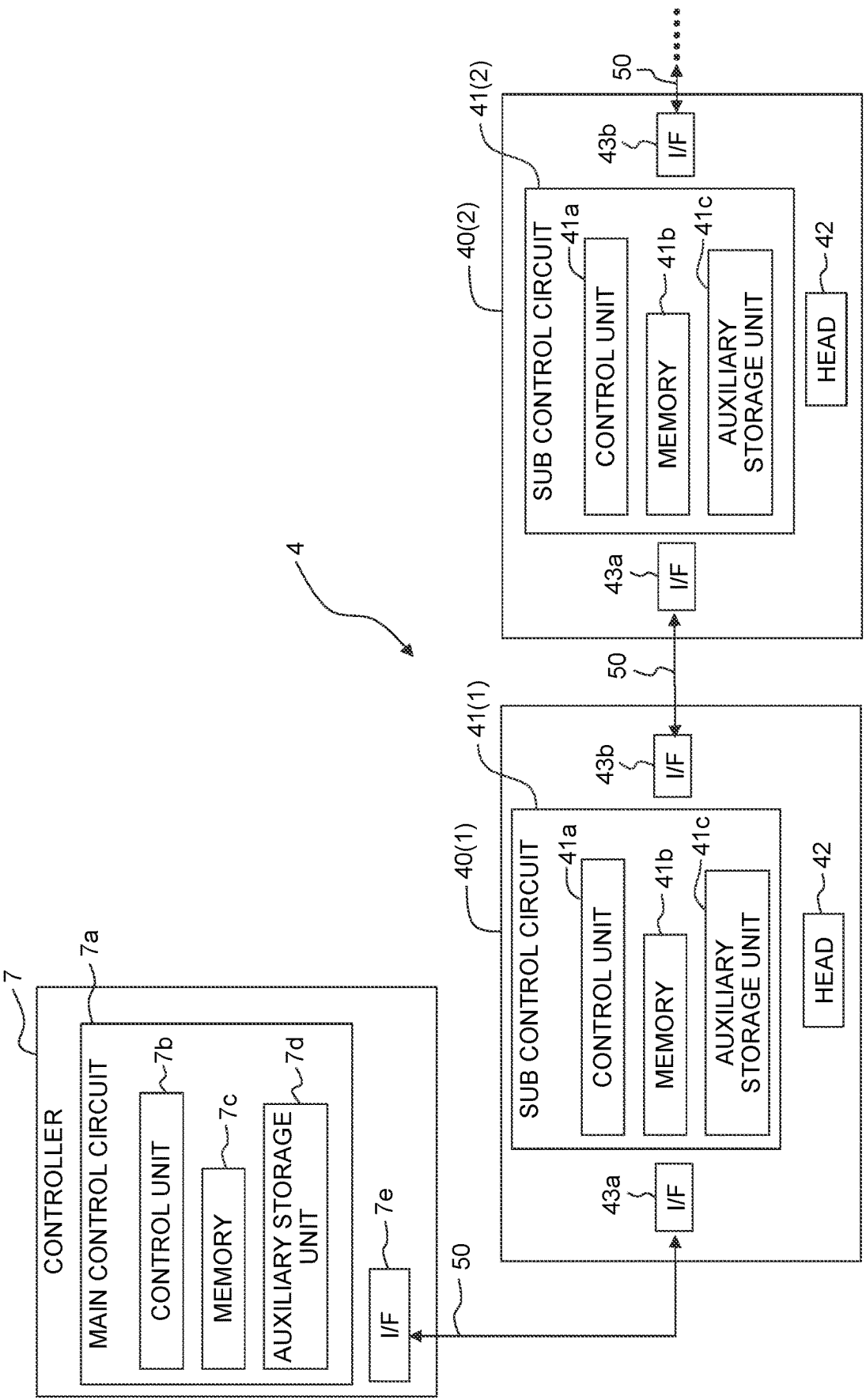
FIG. 3 is a block diagram of a controller and the ink-jet head.

FIG. 3 is a block diagram of the controller 7 and the ink-jet head 4. The controller 7 is provided with a main control circuit 7a. The main control circuit 7a is provided with a control unit 7b, a memory 7c, an auxiliary storage unit 7d and a communication interface (I/F) 7e. The control unit 7b is provided with a logic circuit, such as, for example, a FPGA. Note that the control unit 7b may be provided with a processor such as, for example, a CPU or an ASIC, etc. The memory 7c is, for example, a main storage unit.

The main storage unit is exemplified, for example, by a RAM. The auxiliary storage unit is exemplified, for example, by a ROM and a rewritable storage medium such as, for example, an EEPROM, an EPROM, a hard disc, etc. A control program is stored in the auxiliary storage unit. The control unit 7b is, for example, configured to read the control program from the auxiliary storage unit and into the main storage unit and to execute the control program. The control program may be installed to the auxiliary storage unit from a storage medium 70 (see FIG. 1) which is exemplified, for example, by an optical disc or a portable flash memory. Note that the control program may be downloaded to the auxiliary storage unit from a server which is connected to the printing apparatus 1 via a communication network. The communication I/F 7e is connected to a communication cable 50. The controller 7 is configured to control the printing apparatus 1 based on the control program.

The ink-jet head 4 includes a plurality of head modules 40. The plurality of head modules 40 are arranged, for example, in the left-right direction in one row. The plurality of head modules 40 includes, for example, a first head module 40(1), a second head module 40(2), . . . , and a n-th head module 40(n) (n is a natural number. In this embodiment, n may be nine). The first head module 40(1) is positioned on the leftmost side among the plurality of head modules 40, and the n-th head module 40(n) is positioned on the rightmost side among the plurality of head modules 40. The first head module 40(1) is located at a position closest to the controller 7 among all the plurality of head modules 40, and the n-th head module 40(n) is located at a position farthest from the controller 70 among all the plurality of head modules 40.

Each of the first head module 40(1) to the n-th head module 40(n) is provided with a sub-control circuit 41, the head 42, an upstream-side I/F 43a and a downstream-side I/F 43b. The plurality of heads 42 corresponds to a head group. The sub-control circuit 41 is provided with a control unit 41a, a memory 41b and an auxiliary storage unit 41c. The auxiliary storage unit 41 includes, for example, an ASIC or a Soc. A plurality of pieces of the sub-control circuit 41 correspond to a sub-control circuit group.

The control unit 41a controls an operation of the sub-control circuit 41. The control unit 41a may be provided, for example, with a CPU, and may be provided with a logic circuit such as a FPGA, etc. The memory 41b is, for example, a non-volatile and rewritable memory such as, for example, an EEPROM, an EPROM, etc. In the following, the respective sub-control circuits 41 of the first head module 40(1) to the n-th head module 40(n) are also referred to, respectively, as a sub-control circuit 41(1) to a sub-control circuit 41(n).

The respective I/Fs 7e, 43a and 43b are each an interface capable of performing interactive communication, and are connected in series by a connector and the communication cable 50. The I/F 7e transmits image data included in the printing data to the I/F 43a of the sub-control circuit 41(1). The I/F 43b of the sub-control circuit 41(1) transmits the image data to the I/F 43a of the sub-control circuit 41(2), and the I/F 43b of the sub-control circuit 41(2) transmits the image data to the I/F 43a of the sub-control circuit 41(3). In such a manner, the image data is transferred serially down to the I/F 43a of the sub-control circuit 41(n). Each of the sub-control circuits 41 drives the head 42 based on the image data, and discharges the ink.

Figure 4:
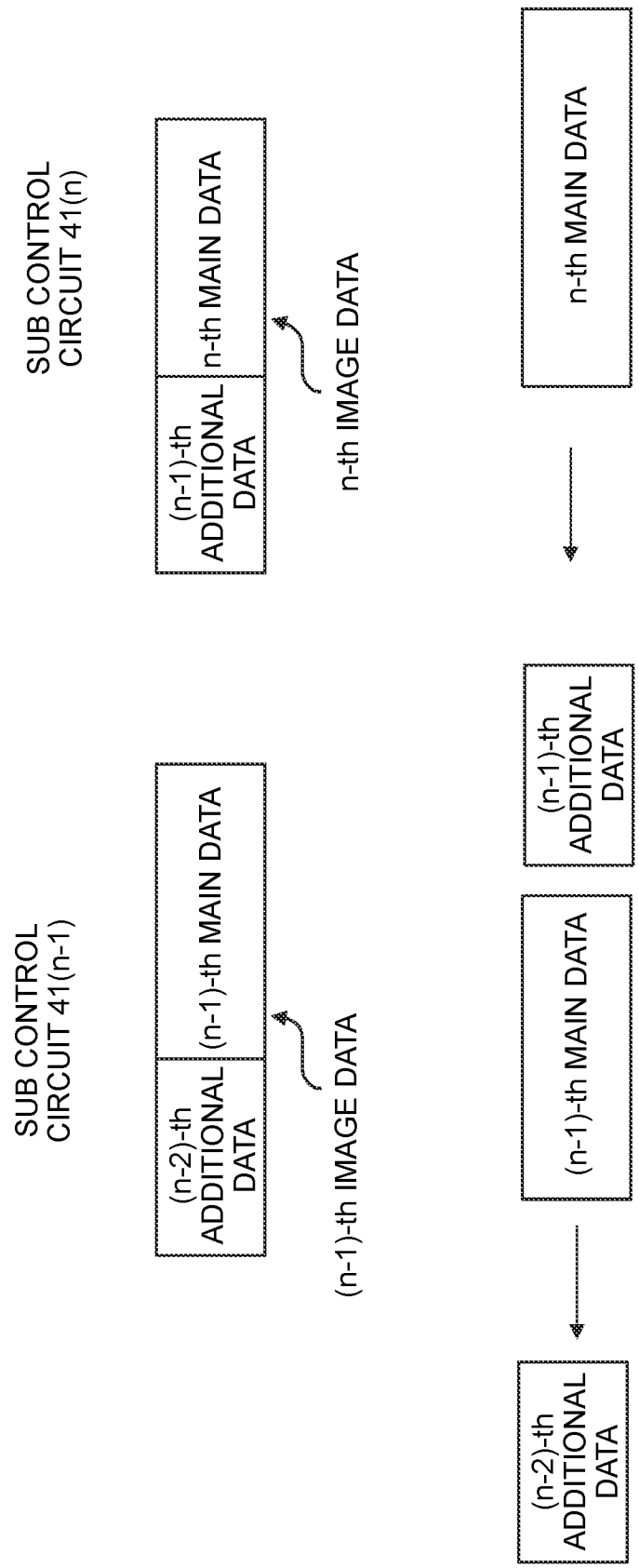
FIG. 4 is an explanatory diagram illustrating a method of transmitting image data in n-th head module and (n−1)-th head module.

FIG. 4 is an explanatory diagram illustrating a method of transmitting image data in the n-th head module 40(n) and a (n−1)-th head module 40(n−1). In the following explanation, image data which is transmitted by the main control circuit 7a to a sub-control circuit 41(k) (k is a natural number in a range of 1 to n) is referred to as k-th image data. At first, the main control circuit 7a transmits n-th image data to the downstream-most sub-control circuit 41(n). After transmitting the n-th image data to the sub-control circuit 41(n), the main control circuit 7a transmits (n−1)-th image data to the sub-control circuit 41(n−1), before determining as to whether or not the sub-control circuit 41(n) has received the n-th image data. Afterwards, the main control circuit 7a transmits (n−2)-th image data to a sub-control circuit 41(n−2), before determining as to whether or not the sub-control circuit 41(n−1) has received the (n−1)-th image data. In such a manner, the main control circuit 7a transmits the image data serially from the downstream-most sub-control circuit 41(n) up to the upstream-most sub-control circuit 41(1).

The n-th image data includes n-th main data for driving the head 42 of the n-th head module 40(n), and (n−1)-th additional data for driving the head 42 of the (n−1)-th head module 40(n−1).

The (n−1)-th image data includes (n−1)-th main data for driving the head 42 of the (n−1)-th head module 40(n−1), and (n−2)-th additional data for driving the head 42 of the (n−2)-th head module 40(n−2).

Namely, the k-th image data (k is a natural number in a range of 2 to n−1) includes k-th main data for driving the head 42 of the k-th head module 40(k), and (k−1)-th additional data for driving the head 42 of the (k−1)-th head module 40(k−1). A data amount of the k-th image data is a maximum amount transmittable under a specification of communication (that is, a maximum transmitting amount allowed by a specification or performance of communication). Accordingly, the main control circuit 7a is capable of easily adding, to the k-th image data, not only the k-th main data but also the (k−1)-th additional data to be transmitted to the (k−1)-th head module 40(k−1) which is positioned upstream of the k-th module 40(k).

The sub-control circuit 41(n) receives the n-th image data, stores the n-th main data in the memory 41b, and transmits the (n−1)-th additional data to the sub-control circuit 41(n−1). The sub-control circuit 41(n−1) receives the (n−1)-th image data from the upstream thereof and receives the (n−1)-th additional data from the sub-control circuit 41(n), namely, from the downstream thereof. The sub-control circuit 41(n−1) merges the (n−1)-th main data and the (n−1)-th additional data and stores the merged data in the memory 41b. Namely, the sub-control circuit 41(n−1) completes image data for printing by own head 42 (that is, the head 42 of the (n−1)-th head module 40(n−1)). The sub-control circuit 41(n−1) transmits the (n−2)-th additional data to the sub-control circuit 41(n−1).

Namely, the sub-control circuit 41(k) (k is the natural number in the range of 2 to n−1) receives the k-th image data from the main control circuit 7a on the upstream thereof, and the sub-control circuit 41(k) receives the k-th additional data from the sub-control circuit 41(k+1), namely, from the downstream thereof. The transmitting of the k-th image data from the main control circuit 7a to the sub-control circuit 41(k) and the transmitting of the k-th additional data from the sub-control circuit 41(k+1) to the sub-control circuit 41(k) are executed in parallel. The sub-control circuit 41(k) merges the k-th main data and the k-th additional data and stores the merged data in the memory 41. Namely, the sub-control circuit 41(k) completes image data for printing by own head 42 (that is, the head 42 of the k-th head module 40(k)), based on the k-th main data and the k-th additional data. The sub-control circuit 41(k) transmits the (k−1)-th additional data to the sub-control circuit 41(k−1).

The sub-control circuit 41(1) receives the first image data from the main control circuit 7a, namely from the upstream thereof, and receives the first additional data from the sub-control circuit 41(2), namely, from the downstream thereof. The first image data includes the first main data. The sub-control circuit 41(1) merges the first main data and the first additional data and stores the merged data in the memory 41b. Namely, the sub-control circuit 41(1) completes image data for printing by own head 42 (that is, the head 42 of the first head module 40(1)), based on the first main data and the first additional data.

Note that in a case that the (k−1)-th additional data is not included in the k-th image data (k is the natural number in the range of 2 to n) received from the upstream, the sub-control circuit 41(k) notifies, to the sub-control circuit 41(k−1), that the (k−1)-th additional data is not present. In a case that the sub-control circuit 41(k−1) receives the notification that there is no (k−1)-th additional data, the sub-control circuit 41(k−1) stores the (k−1)-th main data in the memory 41b. Namely, the sub-control circuit 41(k−1) completes the image data for the printing by own head 42 (that is, the head 42 of the (k−1)-th head module 40(k−1)), without the (k−1)-th additional data, and stores the completed image data in the memory 41b.

Figure 5:
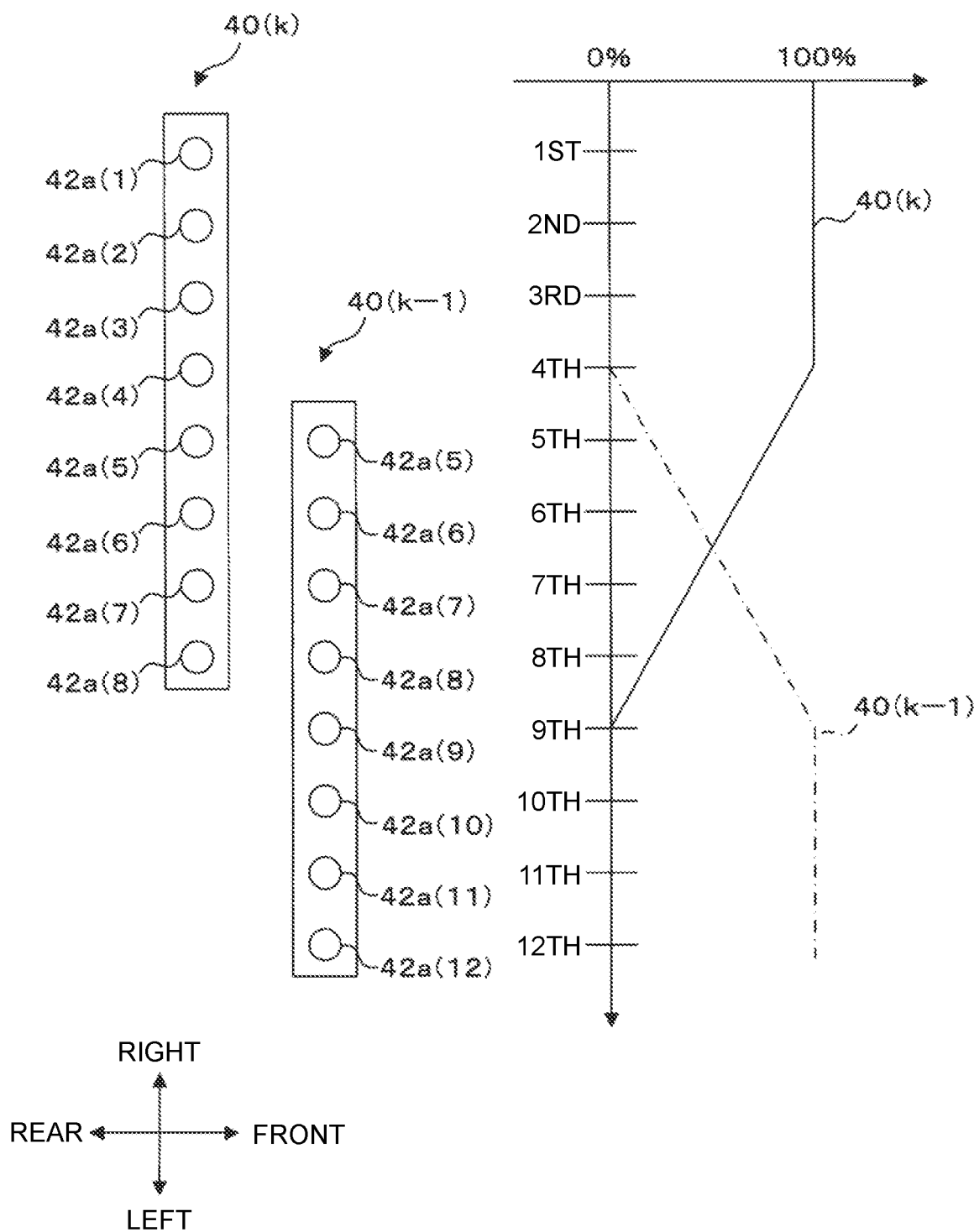
FIG. 5 is an explanatory diagram illustrating a joint correction.

FIG. 5 is an explanatory diagram illustrating a joint correction. The ordinal numbers "1st" to "12th" in FIG. 5 indicate, respectively, a first position to a twelfth position of the nozzles 42a in the left-right direction, wherein the first position indicates the rightmost position, and the twelfth position indicates the leftmost position. For example, the head 42 of the k-th head module 40(k) is provided with a nozzle 42a(1) to a nozzle 42(8). The nozzle 42a(1) to the nozzle 42a(8) are positioned, respectively, at the first position to the eighth position. The head 42 of the (k−1)-th head module 40(k−1) is provided with a nozzle 42a(5) to a nozzle 42a(12). The nozzle 42a(5) to the nozzle 42a(12) are positioned, respectively, at the fifth position to the twelfth position.

The nozzle 42a(5) to the nozzle 42a(8) of the k-th head module 40(k) and the nozzle 42a(5) to the nozzle 42a(8) of the (k−1)-th head module 40(k−1) are positioned to be overlapped in the front-rear direction, namely, in the conveying direction of the recording paper 100. Each of the nozzle 42a(5) to the nozzle 42a(8) of the k-th head module 40(k) corresponds to a "first nozzle" of a "correcting process" of the first aspect, and each of the nozzle 42a(5) to the nozzle 42a(8) of the k−1th head module 40(k−1) corresponds to a "second nozzle" of the "correcting process" of the first aspect.

A graph on the right side of FIG. 5 indicates an example of a usage ratio of the nozzles 42a. A graph in a solid line indicates the usage ratio of each of the nozzles 42a(1) to 42a(8) of the k-th head module 40(k). As indicated in the graph of the solid line, the usage ratio of each of the nozzles 42a(1) to 42a(4) of the k-th head module 40(k) is 100%. The usage ratio of the nozzle 42a(5) is of the k-th head module 40(k) is 80%, the usage ratio of the nozzle 42a(6) of the k-th head module 40(k) is 60%, usage ratio of the nozzle 42a(7) of the k-th head module 40(k) is 40%, and the usage ratio of the nozzle 42a(8) of the k-th head module 40(k) is 20%.

A graph in a one-dot-chain line indicates the usage ratio of each of the nozzles 42a(5) to 42a(12) of the (k−1)-th head module 40(k−1). As indicated in the graph of the one-dot-chain line, the usage ratio of the nozzle 42a(5) of the (k−1)-th head module 40(k−1) is 20%, the usage ratio of the nozzle 42a(6) of the (k−1)-th head module 40(k−1) is 40%, the usage ratio of the nozzle 42a(7) of the k−1th head module 40(k−1) is 60%, and the usage ratio of the nozzle 42a(8) of the (k−1)-th head module 40(k−1) is 80%. The usage ratio of each of the nozzles 42a(9) to 42a(12) of the (k−1)-th head module 42(k−1) is 100%.

Namely, in the joint correction, the usage ratio of each of the respective nozzles 42a which are overlapped in the conveying direction of the recording paper 100 is corrected so that a total of the usage ratios of the nozzles 42a which are overlapped with each other in the conveying direction of the recording paper 100 becomes to be 100%. A difference in the density, between a part printed by the ink discharged from the nozzles 42a(1) to the nozzle 42a(4) and the nozzles 42a(9) to the nozzle 42a(12) which are not overlapped in the conveying direction and a part printed by the ink discharged from the nozzles 42a(5) to the nozzle 42a(8) which are overlapped in the conveying direction, is made small by the joint correction, thereby making it possible to suppress any lowering in the display quality. Whether or not the joint correction is valid is set, for example, when the printing apparatus 1 is shipped as a product. A user is capable of operating an operating part, for example, a touch panel so as to change the validity or the invalidity of the joint correction.

Figure 6:
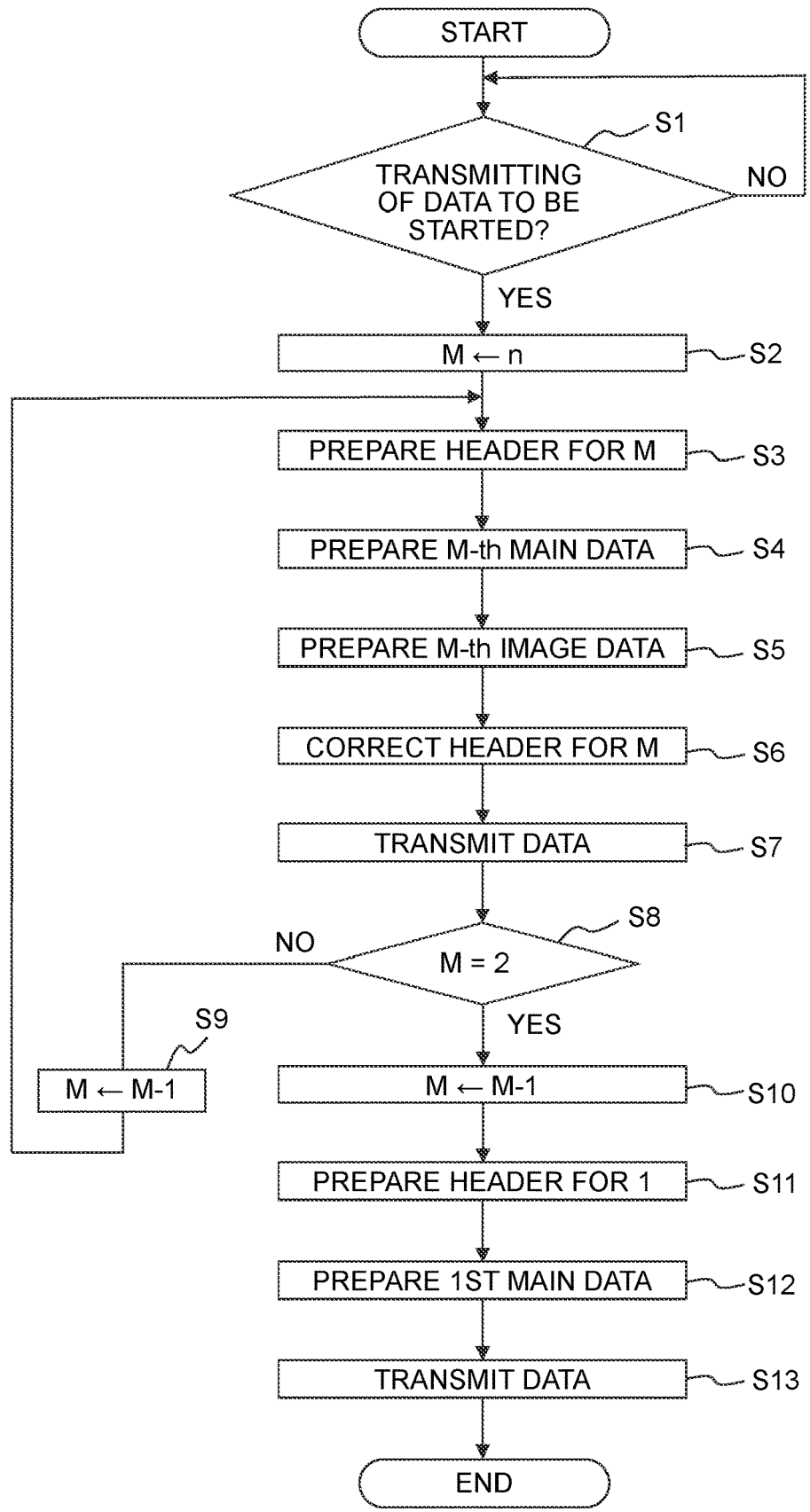
FIG. 6 is a flow chart explaining a data transmitting method by a main control circuit.

FIG. 6 is a flow chart explaining a data transmitting method by the main control circuit 7a. The main control circuit 7a executes each process in accordance with the flow chart, for example, in a case that the printing apparatus 1 is in a standby state. The control unit 7b determines as to whether or not the transmitting of the image data is to be started (step S1). In a case, for example, that the control unit 7*b* has received the image data from the external device 9, the control unit 7*b* starts the transmitting of the image data. In a case that the control unit 7*b* determines that the transmitting of the image data is not to be started (step S1: NO), the control unit 7*b* returns the process to the step S1.

In a case that the control unit 7*b* determines that the transmitting of the image data is to be started (step S1: YES), the control unit 7*b* substitutes "n", namely the ordinal number indicating the downstream-most n-th head module 40(*n*) for a variable M indicating an ordinal number of the head module 40 (step S2). Here, n is not less than 2 (two). Note that the variable M is stored in the memory 7*c* in advance. The control unit 7*b* prepares a header for M (step S3). The header for M is a header added to M-th main data to be used in the printing in a M-th head module 40(M). The control unit 7*b* prepares the M-th main data (step S4). The M-th main data (data for M) is image data to be used in a printing in the M-th head module 40(M).

The control unit 7*b* prepares the M-th image data (step S5). The control unit 7*b* merges the M-th main data and (M−1)-th additional data so as to prepare the M-th image data. The control unit 7*b* corrects the header for M (step S6). The corrected header for M is a header to be added to the M-th image data. The control unit 7*b* adds the header for M to the M-th image data, and transmits the M-th image data to the sub-control circuit 41(M) (step S7). The control unit 7*b* determines as to whether or not M is 2 (step S8). In a case that M is not 2 (step S8: NO), the control unit 7*b* decrements M (step S9) by one, and returns the process to the step S3.

In a case that M is 2 (step S8: YES), the control unit 7*b* decrements M by one (step S10), and prepares a header for 1 (step S11). The control unit 7*b* prepares first main data (step S12). The control unit 7*b* adds the header for 1 to the first main data, and transmits the first main data to the sub-control circuit 41(1) (step S13), and terminates the process. Note that in a case that the control unit 7*b* does not prepare the (M−1)-th additional data, the control unit 7*b* does not execute the steps S5 and S6; rather, the control unit 7*b* adds the header for M prepared in the step S3 to the M-th main data, and transmits the M-th main data to the sub-control circuit 41(M) (step S7).

Figure 7A:
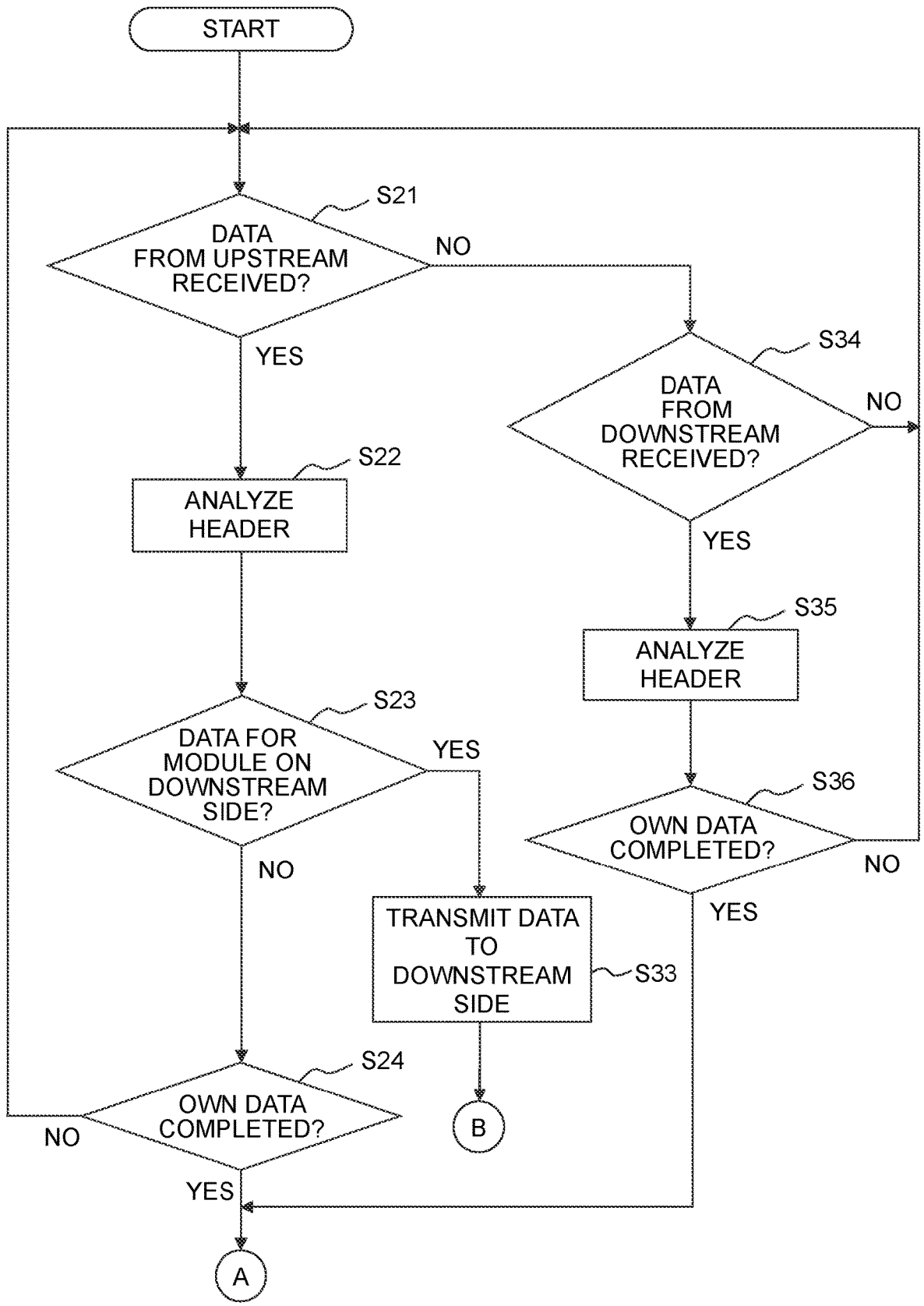
FIGS. 7A and 7B are flow charts explaining a data transmitting method by a sub-control circuit.
Figure 7B:
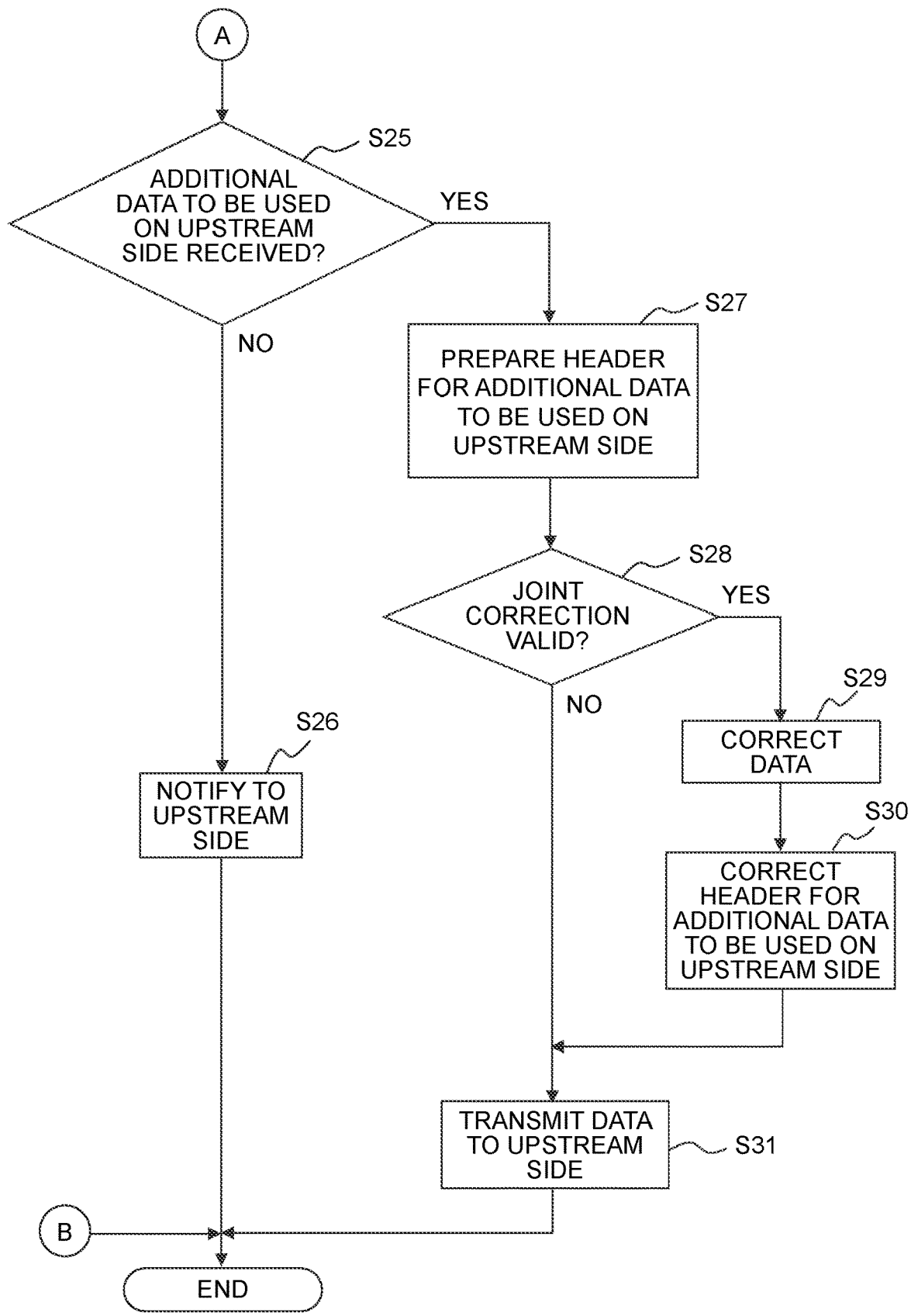

FIGS. 7A and 7B are flow charts illustrating a data transmitting method by the sub-control circuit 41(*k*). Here, "k" is the natural number in the range of 1 to n. The control unit 41*a* of the sub-control circuit 41(*k*) executes each process in accordance with the flow charts, for example, in a case that the printing apparatus 1 is in a standby state. The control unit 41*a* of the sub-control circuit 41(*k*) determines as to whether or not the control unit 41*a* has received data from the upstream thereof (step S21). In a case that the control unit 41*a* determines that the data has been received from the upstream thereof (step S21: YES), the control unit 41*a* analyses the header of the received data (step S22). The control unit 41*a* determines as to whether or not the received data is the data to be received by a head module 40 located on the downstream thereof (step S23). In a case that the control unit 41*a* determines that the received data is the data to be received by the head module 40 on the downstream thereof (step S23: YES), the control unit 41*a* transmits the data to the head module 40 on the downstream thereof (step S33) and terminates the process.

In the step S23, in a case that the control unit 41*a* determines that the received data is not the data to be received by the head module 40 on the downstream thereof (step S23: NO), namely, in a case that the control unit 41*a* determines that the received data is data to be received by own head module 40 (that is, the head module 40 to which the control unit 41*a* itself belongs), the control unit 41*a* determines as to whether or not own data (that is, data for the control unit 41*a* itself) is completed (step S24). Namely, the control unit 41*a* determines as to whether or not data for the k-th head module 40(*k*) has been completed by receiving the k-th main data from the upstream thereof and receiving the k-th additional data from the downstream thereof. Further, in a case that the control unit 41*a* is notified that there is no k-th additional data therefor, the control unit 41*a* determines as to whether or not the data for the k-th head module 40(*k*) is completed by receiving the k-th main data from the upstream thereof.

In a case that the control unit 41*a* determines that the own data is not completed (step S24: NO), the control unit 41*a* returns the process to the step S21. In the step S21, in a case that the control unit 41*a* determines that the control unit 41*a* has not received the data from the upstream thereof (step S21: NO), the control unit 41*a* determines as to whether or not the control unit 41*a* has received the data from the downstream thereof (steps S34). In a case that the control unit 41*a* determines that the control unit 41*a* has not received the data from the downstream thereof (step S34: NO), namely, in a case that the control unit 41*a* has not received the data from the upstream thereof and from the downstream thereof, the control unit 41*a* returns the process to the step S21.

In a case that the control unit 41*a* determines that the control unit 41*a* has received the data from the downstream thereof (step S34: YES), the control unit 41*a* analyses a header of the received data (step S35). The control unit 41*a* determines as to whether or not the own data is completed (step S36). Namely, the control unit 41*a* determines as to whether or not the data for the k-th head module 40(*k*) has been completed by receiving the k-th main data from the upstream thereof and receiving the k-th additional data from the downstream thereof. Further, in a case that the control unit 41*a* is notified that there is no k-th additional data therefor, the control unit 41*a* determines as to whether or not the data for the k-th head module 40(*k*) has been completed by receiving the k-th main data from the upstream thereof. In a case that the control unit 41*a* determines that the own data has not been completed (step S36: NO), the control unit 41*a* returns the process to the step S21.

In a case that the control unit 41*a* determines, in the step S24 or the step S36, that the own data has been completed (step S24: YES or step S36: YES), the control unit 41*a* determines as to whether or not the control unit 41*a* has received the (k−1)-th additional data to be used in the (k−1)-th head module 40(*k*−1) on the upstream thereof (step S25). Namely, the control unit 41*a* determines as to whether or not the received k-th image data includes the (k−1)-th additional data. Note that the own data which is completed is stored in the memory 41*b* of the sub-control circuit 41(*k*).

In a case that the control unit 41*a* determines that the control unit 41*a* has not received the (k−1)-th additional data (step S25: NO), the control unit 41*a* notifies the sub-control circuit 41(*k*−1) on the upstream thereof that there is not (k−1)-th additional data (step S26), and terminates the process. In the step 25, in a case that the control unit 41*a* determines that the control unit 41*a* has received the (k−1)-th additional data (step S25: YES), namely, in a case that the received k-th image data includes the (k−1)-th additional data, the control unit 41*a* prepares a header to be added to the (k−1)-th additional data for the control unit 41*a* on the upstream thereof, and adds the prepared header to the (k−1)-th additional data (step S27). The header includes information indicating the sub-control circuit $41(k-1)$ as a destination. The control unit $41a$ determines as to whether or not the joint correction is valid (step S28).

In a case that the control unit $41a$ determines that the joint correction is valid (step S28: YES), the control unit $41a$ corrects the (k−1)-th additional data (step S29). For example, as depicted in FIG. 5, in a case that the (k−1)-th additional data includes data to be used for driving the nozzles $42a(5)$ to $42a(8)$ of the (k−1)-th head module $40(k-1)$ and that the k-th image data includes data to be used for driving the nozzles $42a(5)$ to $42a(8)$ of the k-th head module $40(k)$, the control unit $41a$ of the sub-control circuit $41(k)$ corrects the (k−1)-th additional data so that the data to be used for driving the nozzles $42a(5)$ to $42a(8)$ of the (k−1)-th head module $40(k-1)$ becomes to be a same data as the data to be used for driving the nozzles $42a(5)$ to $42a(8)$ of the k-th head module $40(k)$.

The control unit $41a$ of the sub-control circuit $41(k)$ corrects the header of the (k−1)-th additional data for the control unit $41a$ on the upstream thereof (step S30). For example, as depicted in FIG. 5, the control unit $41a$ of the sub-control circuit $41(k)$ corrects the header of the (k−1)-th additional data so that the usage ratio of driving of the nozzles $42a(5)$ to $42a(8)$ of the (k−1)-th head module $40(k-1)$ becomes to be a ratio (second ratio) indicated by the graph of the one-dot-chain line of FIG. 5.

Note that the sub-control circuit $41(k)$ uses the nozzles $42a(5)$ to $42a(8)$ of the k-th head module $40(k)$ at a ratio (first ratio) indicated by the graph of the solid line in FIG. 5. The sub-control circuit $41(k-1)$ uses the nozzles $42a(5)$ to $42a(8)$ of the (k−1)-th head module $40(k-1)$ at the second ratio. Namely, the nozzles $42a(5)$ to $42a(8)$ of the k-th head module $40(k)$ and the nozzles $42a(5)$ to $42a(8)$ of the (k−1)-th head module $40(k-1)$ are in a complimentary relationship; in a case that the nozzles $42a(5)$ to $42a(8)$ of the k-th head module $40(k)$ discharge the ink at the first ratio and that the nozzles $42a(5)$ to $42a(8)$ of the (k−1)-th head module $40(k-1)$ discharge the ink at the second ratio, an image based on the image data is printed on the recording medium.

After the processing of the step S30, or in a case that the control unit $41a$ determines in the step S28 that the joint correction is not valid (step S28: NO), the control unit $41a$ adds the header to the (k−1)-th additional data and transmits the (k−1)-th additional data to the sub-control circuit $41(k-1)$ on the upstream thereof (step S31), and terminates the process.

In the first embodiment, although the control unit $41a$ of the sub-control circuit $41(k)$ determines as to whether or not the control unit $41a$ has received the data from the upstream thereof (step S21), the upstream may be the controller 7. Namely, in the step S21, the control unit $41a$ of the first head module $40(1)$ determines as to whether or not the control unit $41a$ has received the data from the controller 7. Further, in the step S25, in a case that the control unit $41a$ of the sub-control circuit $41(1)$ receives only the first main data from the controller 7 and that the control unit $41a$ does not receive the additional data (step S25: NO), the control unit $41a$ of the sub-control circuit $41(1)$ notifies, in the step S26, the controller 7 that there is no additional data, and terminates the process.

In a case that the control unit $41a$ of each of the plurality of head modules 40 determines that the own data has been completed (step S24: YES or step S36: YES), the control unit $41a$ of each of the plurality of head modules 40 notifies the controller 7 that the own data has been completed. In a case that the controller 7 has received notifications from all the plurality of head modules 40 that the own data of each of the plurality of head modules 40 has been completed, namely, in a case that all the plurality of head modules have completed the own data, the controller 7 executes the printing.

Second Embodiment

Figure 8:
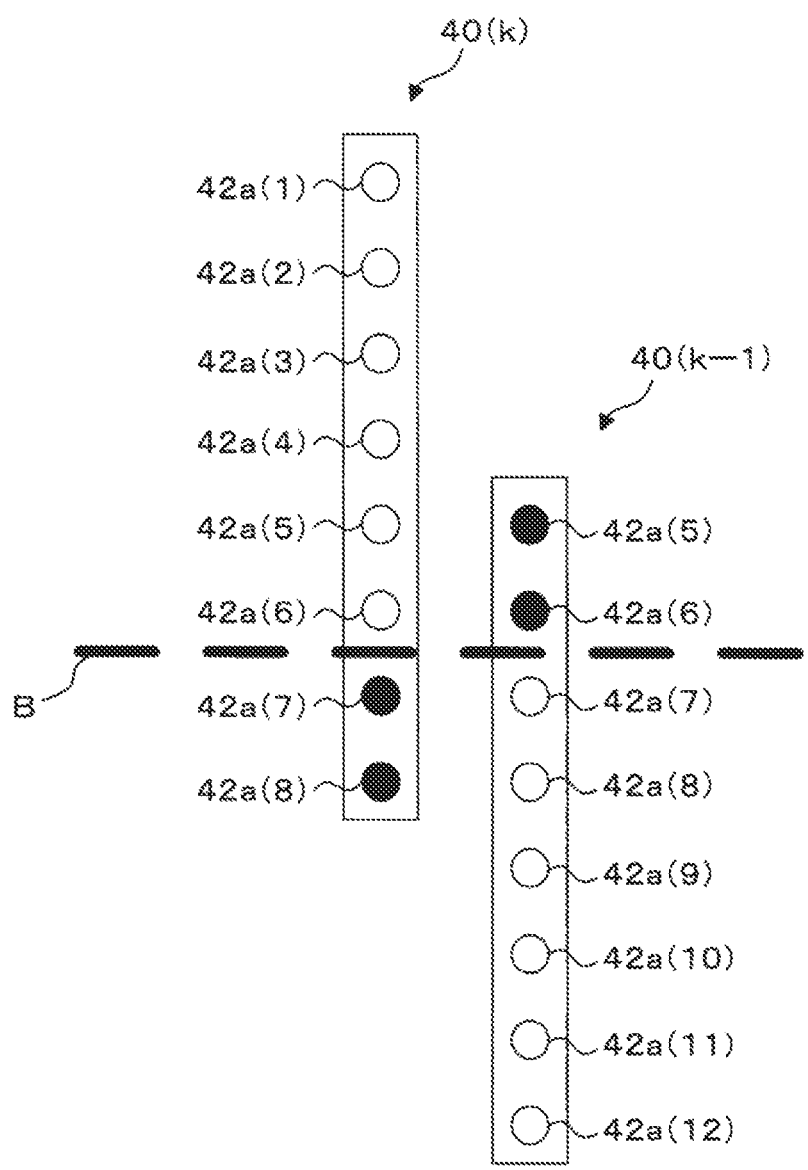
FIG. 8 is an explanatory diagram illustrating a joint correction.

In the following, the present disclosure will be explained based on the drawings depicting a printing apparatus according to a second embodiment. In the configuration according to the second embodiment, the constitutive parts or components, which are same as or similar to those of the first embodiment, are designated by the same reference numerals, and detailed explanation therefor is omitted. FIG. 8 is an explanatory diagram illustrating a joint correction. FIG. 8 indicates, similarly to FIG. 5, nozzles $42a(1)$ to $42a(8)$ of a k-th head module $40(k)$ and nozzles $42a(5)$ to $42a(12)$ of a (k−1)-th head module $40(k-1)$. The nozzles $42a(7)$ and $42a(8)$ of the k-th head module $40(k)$ and the nozzles $42a(5)$ and $42a(6)$ of the (k−1)-th head module $40(k-1)$ are printed in black (solid), indicating these nozzles are non-used nozzles. A broken line B indicates the boundary between used nozzles and the non-used nozzles. The usage rate of the used nozzles is 100%.

In the joint correction, one of nozzles, of the plurality of nozzles, which overlap in the conveying direction of the recording paper 100 is used, whereas the other of the nozzles overlapping in the conveying direction is not used. Specifically, the nozzle $42a(5)$ and $42a(6)$ of the k-th head module $40(k)$ are used, whereas the nozzle $42a(5)$ and $42a(6)$ of the (k−1)-th head module $40(k-1)$ are not used. The nozzle $42a(7)$ and $42a(8)$ of the k-th head module $40(k)$ are not used, whereas the nozzle $42a(7)$ and $42a(8)$ of the (k−1)-th head module $40(k-1)$ are used. The nozzle $42a(6)$ of the k-th head module $40(k)$ corresponds to a "first nozzle" of a "correcting process" of the second aspect, and the nozzle $42a(7)$ of the k-th head module $40(k)$ corresponds to a "third nozzle" of the "correcting process" of the second aspect. The nozzle $42a(6)$ of the (k−1)-th head module $40(k)$ corresponds to a "second nozzle" of the "correcting process" of the second aspect, and the nozzle $42a(7)$ of the (k−1)-th head module $40(k)$ corresponds to a "fourth nozzle" of the "correcting process" of the second aspect.

A difference in the density, between a part printed by the ink discharged from the nozzles $42a(1)$ to the nozzle $42a(4)$ and the nozzles $42a(9)$ to the nozzle $42a(12)$ which are not overlapped in the conveying direction, and a part printed by the ink discharged from the nozzles $42a(5)$ to the nozzle $42a(8)$ which are overlapped in the conveying direction, is made small by the joint correction, thereby making it possible to suppress any lowering in the display quality. Whether or not the joint correction is valid is set, for example, when the printing apparatus 1 is shipped as a product. The user is capable of operating the operating part, for example, the touch panel, so as to change the validity or invalidity of the joint correction.

Figure 9A:
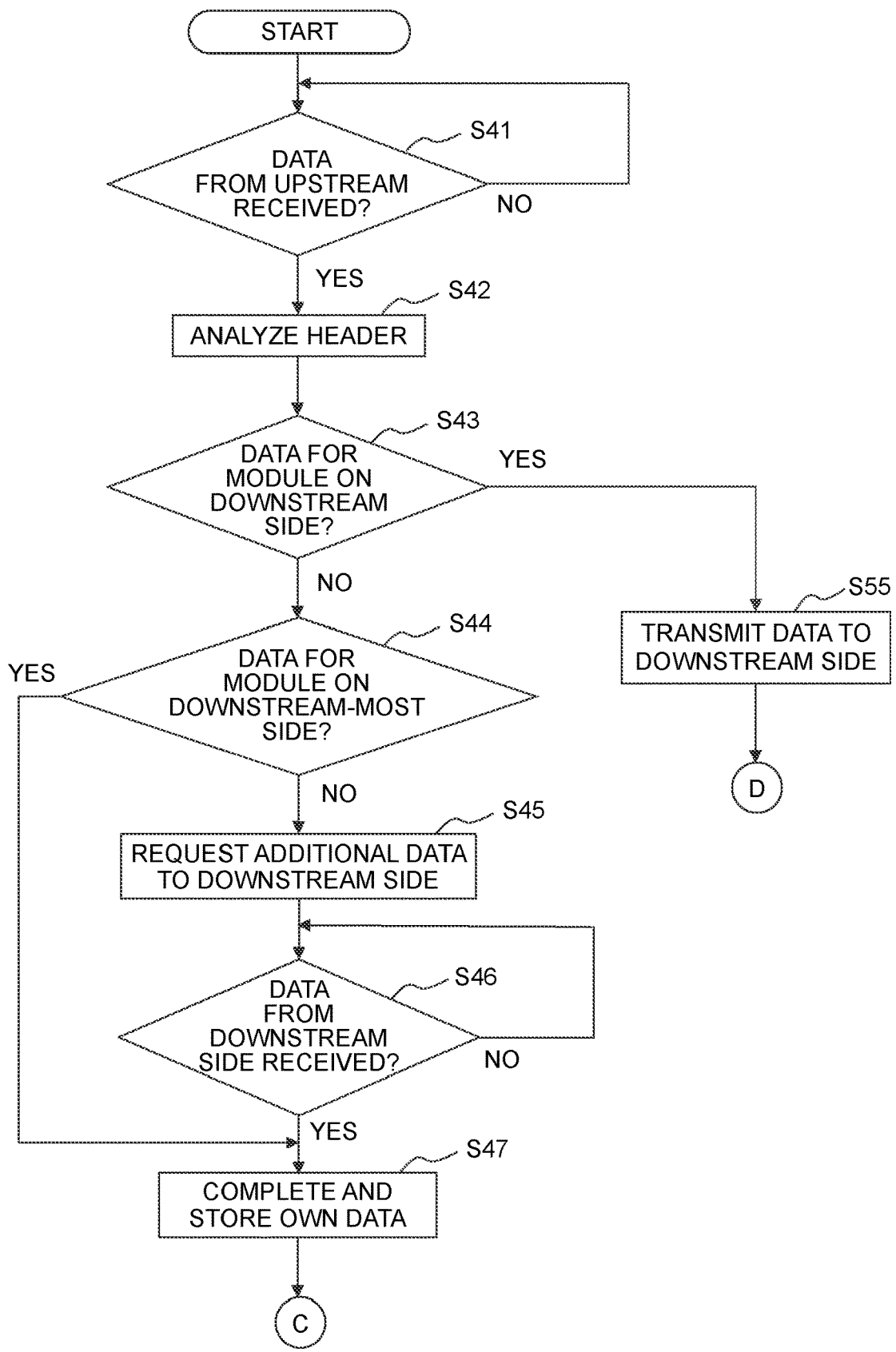
FIGS. 9A and 9B are flow charts explaining a data transmitting method by a sub-control circuit.
Figure 9B:
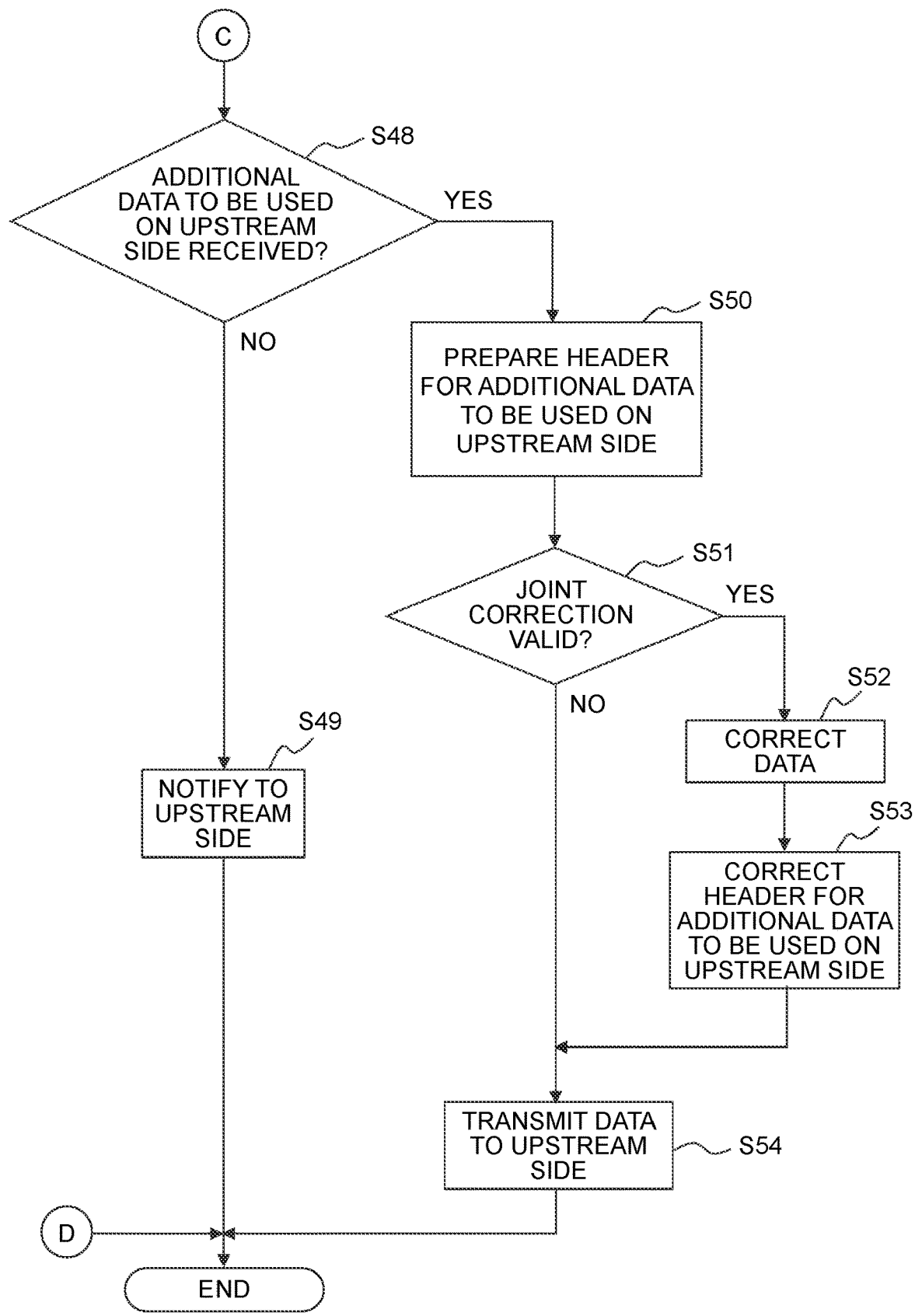

FIGS. 9A and 9B are flow charts explaining a data transmitting method by the sub-control circuit $41(k)$. Here, "k" is the natural number in the range of 1 to n. The control unit $41a$ of the sub-control circuit $41(k)$ executes each process in accordance with the flow charts, for example, in a case that the printing apparatus 1 is in a standby state. The control unit $41a$ of the sub-control circuit $41(k)$ determines as to whether or not the control unit $41a$ has received data from the upstream thereof (step S41). In a case that the control unit $41a$ determines that the control unit $41a$ has received the data from the upstream thereof (step S41: YES), the control unit 41*a* analyses a header of the received data (step S42). The control unit 41*a* determines as to whether or not the received data is the data to be received by a head module 40 on the downstream thereof (step S43). In a case that the control unit 41*a* determines that the received data is the data to be received by the head module 40 on the downstream thereof (step S43: YES), the control unit 41*a* transmits the data to the head module 40 on the downstream thereof (step S55) and terminates the process.

In the step S43, in a case that the control unit 41*a* determines that the received data is not the data to be received by the head module 40 on the downstream (step S43: NO), namely, in a case that the control unit 41*a* determines that the received data is data to be received by own head module 40 (that is, the head module 40 to which the control unit 41*a* itself belongs), the control unit 41*a* determines as to whether or not the data is data which is to be received by a downstream-most n-th head module 40(*n*) (step S44). In other words, the control unit 41*a* determines as to whether or not the control unit 41*a* itself belongs to the downstream-most n-th head module 40(*n*). In a case that the control unit 41*a* determines that the data is not the data which is to be received by the downstream-most n-th head module 40(*n*) (step S44: NO), the control unit 41*a* requests the k-th additional data to a (k+1) head module 40(*k*+1) which is on the downstream thereof (step S45).

The control unit 41*a* determines as to whether or not the control unit 41*a* has received the k-th additional data from the downstream thereof (step S46). In a case that the control unit 41*a* determines that the control unit 41*a* has not received the k-th additional data from the downstream thereof (step S46: NO), the control unit 41*a* returns the process to the step S46. In a case that the control unit 41*a* determines that the control unit 41*a* has received the k-th additional data from the downstream thereof (step S46: YES), or in a case that the control unit 41*a* determines that the data is data which it to be received by the downstream-most n-th head module 40(*n*) (step S44: YES), the control unit 41*a* completes own data (that is, data for the control unit 41*a* itself) (step S47). Namely, the control unit 41*a* receives the k-th main data from the upstream thereof, and receives the k-th additional data from the downstream thereof, thereby completing the data for the k-th head module 40(*k*). The completed own data is stored in the memory 41*b* of the sub-control circuit 41(*k*). The control unit 41*a* determines as to whether or not the control unit 41*a* has received the (k−1)-th additional data which is to be used in the (k−1)-th head module 41(*k*−1) on the upstream thereof (step S48). Namely, the control unit 41*a* determines as to whether or not the received k-th image data includes the (k−1)-th additional data.

In a case that the control unit 41*a* determines that the control unit 41*a* has not received the (k−1)-th additional data (step S48: NO), the control unit 41*a* notifies the sub-control circuit 41(*k*−1) on the upstream thereof that there is no (k−1)-th additional data (step S49), and terminates the process. In the step 48, in a case that the control unit 41*a* determines that the control unit 41*a* has received the (k−1)-th additional data for the upstream sub-control circuit 41(*k*−1) (step S48: YES), namely, in a case that the control unit 41*a* determines that the received k-th image data includes the (k−1)-th additional data, the control unit 41*a* prepares a header to be added to the (k−1)-th additional data for the upstream sub-control circuit 41(*k*−1) (step S50). The header includes information indicating the sub-control circuit 41(*k*−1) as a destination. The control unit 41*a* determines as to whether or not the joint correction is valid (step S51).

In a case that the control unit 41*a* determines that the joint correction is valid (step S51: YES), the control unit 41*a* corrects the (k−1)-th additional data (step S52). For example, in a case that the (k−1)-th additional data includes data to be used for driving the nozzles 42*a*(5) to 42*a*(8) of the (k−1)-th head module 40(*k*−1) and that the k-th image data includes data to be used for driving the nozzles 42*a*(5) to 42*a*(8) of the k-th head module 40(*k*), the control unit 41*a* of the sub-control circuit 41(*k*) corrects the (k−1)-th additional data so that the data to be used for driving the nozzles 42*a*(5) to 42*a*(8) of the (k−1)-th head module 40(*k*−1) becomes to be same data as the data to be used for driving the nozzles 42*a*(5) to 42*a*(8) of the k-th head module 40(*k*).

The control unit 41*a* of the sub-control circuit 41(*k*) corrects the header of the (k−1)-th additional data for the upstream sub-control circuit 41(*k*−1) (step S53). For example, as depicted in FIG. 8, the control unit 41*a* of the sub-control circuit 41(*k*) corrects the header of the (k−1)-th additional data so that the nozzle 42(5) and the nozzle 42(6) of the (k−1)-th head module 40(*k*−1) are not driven, namely, become to be the non-usable nozzles.

Note that the sub-control circuit 41(*k*) controls the head 42 of the k-th head module 42(*k*) so that the nozzle 42(7) and the nozzle 42(8) of the k-th head module 40(*k*) are not driven, namely, become to be the non-usable nozzles.

After the process of step S53, or in a case that the control unit 41*a* determines in the step S51 that the joint correction is not valid (step S51: NO), the control unit 41*a* adds the header to the (k−1)-th additional data and transmits the (k−1)-th additional data to the sub-control circuit 41(*k*−1) on the upstream thereof (step S54), and terminates the process.

In the second embodiment, although the control unit 41*a* of the sub-control circuit 41(*k*) determines as to whether or not the control unit 41*a* has received the data from the upstream thereof (step S41), the upstream may be the controller 7. Namely, in the step S41, the control unit 41*a* of the first head module 40(1) determines as to whether or not the control unit 41*a* has received the data from the controller 7. Further, in the step S48, in a case that the control unit 41*a* of the sub-control circuit 41(1) has received only the first main data from the controller 7 and that the control unit 41*a* has not received the additional data (step S48: NO), the control unit 41*a* of the sub-control circuit 41(1) notifies, in the step S49, the controller 7 that there is no additional data, and terminates the process.

In a case that the control unit 41*a* of each of the plurality of head modules 40 has completed the own data (step S47: YES), the control unit 41*a* of each of the plurality of head modules 40 notifies the controller 7 that the own data is completed. In a case that the controller 7 has received notifications from all the plurality of head modules 40 that the own data is completed, namely, in a case that all the plurality of head modules have completed the own data, the controller 7 executes the printing.

Note that the computer program is capable of being arranged on a single computer, or being arranged on one site, or being extended such that the computer program is executed on a plurality of computers dispersed over a plurality of sites and interconnected by a communication network.

The embodiments disclosed herein are examples in all senses, and should be interpreted not restrictive or limiting in any way. The scope of the present disclosure is intended to encompass all the changes within the scope of the claims and a scope equivalent to the scope of the claims. The technical features described in the respective embodiments can be combined with each other. Further, the independent claims and the dependent claims described in the claims can be combined with each other in all and any combinations, irrespective of the form of reference therebetween.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A printing apparatus comprising:
   a main control circuit;
   a sub-control circuit group connected to the main control circuit in series, the sub-control circuit group being configured to transfer image data from the main control circuit downstream; and
   a head group configured to be driven by the sub-control circuit group, wherein:
   the sub-control circuit group has at least two sub-control circuits including a second sub-control circuit and a first sub-control circuit connected to the second sub-control circuit at an upstream of the second sub-control circuit;
   the image data includes second image data and first image data; and
   the main control circuit is configured to:
      transmit the second image data to the second sub-control circuit; and
      transmit the first image data to the first sub-control circuit after the transmitting of the second image data.

2. The printing apparatus according to claim 1, wherein the main control circuit is configured to:
   determine as to whether or not the second sub-control circuit has received the second image data; and
   transmit the first image data to the first sub-control circuit, before the main control circuit determines as to whether or not the second sub-control circuit has received the second image data.

3. The printing apparatus according to claim 1, wherein the head group has at least two head including a second head configured to be driven by the second sub-control circuit, and a first head configured to be driven by the first sub-control circuit; and
   the second image data includes main data to be used for a driving of the second head, and additional data to be used for a printing by a driving of the first head.

4. The printing apparatus according to claim 3, wherein a data amount of the second image data is a maximum amount transmittable under a specification of communication.

5. The printing apparatus according to claim 1, wherein in a case that the second sub-control circuit has received the second image data, the second sub-control circuit is configured to transmit the additional data to the first sub-control circuit.

6. The printing apparatus according to claim 5, wherein the printing apparatus is configured to execute the transmitting of the additional data from the second sub-control circuit to the first sub-control circuit and the transmitting of the first image data from the main control circuit to the first sub-control circuit in parallel.

7. The printing apparatus according to claim 5, wherein the second sub-control circuit is configured to:
   in a case that the second sub-control circuit has received the second image data, determine as to whether or not the second image data includes the additional data;
   in a case that the second image data includes the additional data, prepare a header indicating the first sub-control circuit as a destination; and
   add the header to the additional data.

8. The printing apparatus according to claim 5, wherein the first sub-control circuit is configured to:
   determine as to whether or not the first sub-control circuit has received the first image data from the upstream;
   determine as to whether or not the first sub-control circuit has received the additional data from the downstream; and
   transmit data to the upstream, in a case that the first sub-control circuit has received the first image data and the additional data.

9. The printing apparatus according to claim 5, wherein the first sub-control circuit is configured to:
   determine as to whether or not the first sub-control circuit has received the first image data from the upstream;
   request the additional data to the downstream in a case that the first sub-control circuit has received the first image data;
   determine as to whether or not the first sub-control circuit has received the additional data from the downstream; and
   transmit data to the upstream, in a case that the first sub-control circuit has received the additional data.

10. The printing apparatus according to claim 1, wherein the main control circuit is configured to transmit the image data serially from a downstream-most sub-control circuit up to an upstream-most sub-control circuit.

11. The printing apparatus according to claim 1, further comprising a conveyor configured to convey a recording medium, wherein:
    the head group has at least two heads including a second head configured to be driven by the second sub-control circuit and a first head configured to be driven by the first sub-control circuit;
    a first nozzle of the second head and a second nozzle of the first head are overlapped with each other in a conveying direction of the recording medium; and
    the second sub-control circuit is configured to:
       determine as to whether or not to execute a correcting process of correcting a usage ratio of the first nozzle and the second nozzle;
       in a case that the second sub-control circuit determines to execute the correcting process, transmit, to the first sub-control circuit, data to be used for a driving of the first nozzle included in the second image data;
       use the first nozzle at a first ratio after the transmitting of the data to be used for the driving of the first nozzle to the first sub-control circuit; and
    the first sub-control circuit is configured to use the second nozzle at a second ratio based on the data to be used for the driving of the first nozzle.

12. The printing apparatus according to claim 1, further comprising a conveyor configured to convey a recording medium, wherein:

the head group has at least two heads including a second head configured to be driven by the second sub-control circuit and a first head configured to be driven by the first sub-control circuit;

the second head has a first nozzle and a third nozzle adjacent to the first nozzle;

the first head has a second nozzle and a fourth nozzle adjacent to the second nozzle;

the first nozzle and the second nozzle are overlapped with each other in a conveying direction of the recording medium, and the third nozzle and the fourth nozzle are overlapped with each other in the conveying direction of the recording medium; and the second sub-control circuit is configured to:
  determine as to whether or not to execute a correcting process of correcting a driving of the first nozzle, the second nozzle, the third nozzle and the fourth nozzle; and
  in a case that the second sub-control circuit determines to execute the correcting process, transmit, to the first sub-control circuit, data to be used for the driving of the third nozzle included in the second image data, and use the first nozzle for printing without using the third nozzle for the printing; and
the first sub-control circuit is configured to use the fourth nozzle for the printing and not to use the second nozzle for the printing based on the data to be used for the driving of the third nozzle.

13. A data transmitting method executed by a printing apparatus,
  the printing apparatus including:
  a main control circuit;
  a sub-control circuit group connected to the main control circuit in series, the sub-control circuit group being configured to transfer image data from the main control circuit downstream; and
  a head group configured to be driven by the sub-control circuit group, wherein:
  the sub-control circuit group has at least two sub-control circuits including a second sub-control circuit and a first sub-control circuit connected to the second sub-control circuit at an upstream of the second sub-control circuit; and
  the image data includes second image data and first image data, the method comprising:
    transmitting the second image data to the second sub-control circuit by the main control circuit; and
    transmitting the first image data to the first sub-control circuit by the main control circuit, after the transmitting of the second image data.

14. A non-transitory computer-readable medium storing a program that is executable by a printing apparatus,
  the printing apparatus including:
  a main control circuit;
  a sub-control circuit group connected to the main control circuit in series, the sub-control circuit group being configured to transfer image data from the main control circuit downstream; and
  a head group configured to be driven by the sub-control circuit group, wherein:
  the sub-control circuit group has at least two sub-control circuits including a second sub-control circuit and a first sub-control circuit connected to the second sub-control circuit at an upstream of the second sub-control circuit; and
  the image data includes second image data and first image data, the program is configured to cause the main control circuit to execute a process of:
    transmitting the second image data to the second sub-control circuit; and
    transmitting the first image data to the first sub-control circuit after the transmitting of the second image data.

* * * * *